(12) United States Patent
Le Moing et al.

(10) Patent No.: US 11,425,496 B2
(45) Date of Patent: Aug. 23, 2022

(54) TWO-DIMENSIONAL SOUND LOCALIZATION WITH TRANSFORMATION LAYER

(71) Applicant: INTERNATIONAL BUSINESS MACHINES CORPORATION, Armonk, NY (US)

(72) Inventors: Guillaume Jean Victor Marie Le Moing, Montbonnot Saint Martin (FR); Phongtharin Vinayavekhin, Tokyo (JP); Jayakorn Vongkulbhisal, Tokyo (JP); Don Joven Ravoy Agravante, Tokyo (JP); Tadanobu Inoue, Kanagawa (JP); Asim Munawar, Ichikawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 217 days.

(21) Appl. No.: 16/864,795

(22) Filed: May 1, 2020

(65) Prior Publication Data
US 2021/0345039 A1 Nov. 4, 2021

(51) Int. Cl.
*H04R 5/00* (2006.01)
*H04R 3/00* (2006.01)
(Continued)

(52) U.S. Cl.
CPC ............ *H04R 3/005* (2013.01); *G06N 3/084* (2013.01); *G06N 5/046* (2013.01); *G06N 20/00* (2019.01); *H04R 5/04* (2013.01)

(58) Field of Classification Search
CPC ........................................................ H04R 5/00
See application file for complete search history.

(56) References Cited

U.S. PATENT DOCUMENTS 5,737,485 A * 4/1998 Flanagan ................ G10L 15/16
  704/E15.017
8,649,529 B2   2/2014 Klefenz et al.
(Continued)

FOREIGN PATENT DOCUMENTS

CN   104459625 A  *  3/2015  ............... G01S 5/22
CN   108983148 A  * 12/2018  ............... G01S 5/22

OTHER PUBLICATIONS

Grace Period Disclosure: Vinayavekhin et al., "Learning 2D Sound Source Localization for Microphone Array Layout Invariance using Explicit Transformation Layer", IBM Research Tokyo, MINES ParisTech—PSL Research University, Feb. 2020, pp. 1-3.
(Continued)

*Primary Examiner* — Olisa Anwah
(74) *Attorney, Agent, or Firm* — Tutunjian & Bitetto, P.C.; Randall Bluestone

(57) ABSTRACT

Methods and systems for localizing a sound source include determining a spatial transformation between a position of a reference microphone array and a position of a displaced microphone array. A sound is measured at the reference microphone array and at the displaced microphone array. A source of the sound is localized using a neural network that includes respective paths for the reference microphone array and the displaced microphone array. The neural network further includes a transformation layer that represents the spatial transformation.

20 Claims, 6 Drawing Sheets

(51) Int. Cl.
*H04R 5/04* (2006.01)
*G06N 20/00* (2019.01)
*G06N 5/04* (2006.01)
*G06N 3/08* (2006.01)

(56) References Cited

U.S. PATENT DOCUMENTS

| | | | | |
|---|---|---|---|---|
| 8,676,728 | B1* | 3/2014 | Velusamy | G06N 3/08 706/62 |
| 9,357,293 | B2* | 5/2016 | Claussen | H04R 3/005 |
| 9,549,253 | B2* | 1/2017 | Alexandridis | H04R 3/005 |
| 9,753,119 | B1* | 9/2017 | Velusamy | G01S 17/894 |
| 9,813,810 | B1* | 11/2017 | Nongpiur | G06N 3/08 |
| 10,063,965 | B2* | 8/2018 | Kim | G01S 5/18 |
| 10,848,865 | B2* | 11/2020 | Zhu | H04R 1/406 |
| 2003/0185410 | A1* | 10/2003 | June | H04R 1/406 381/94.1 |
| 2015/0221321 | A1* | 8/2015 | Christian | G10L 25/48 700/94 |
| 2017/0251300 | A1* | 8/2017 | Kanamori | G10L 21/0208 |
| 2017/0353789 | A1* | 12/2017 | Kim | H04R 5/027 |
| 2019/0154791 | A1* | 5/2019 | Jowett | G01S 3/8083 |
| 2020/0064438 | A1* | 2/2020 | Swanson | G01S 5/20 |
| 2020/0066023 | A1* | 2/2020 | Nakadai | G06T 15/00 |
| 2020/0396537 | A1* | 12/2020 | Solvang | H04R 29/005 |
| 2021/0020190 | A1* | 1/2021 | Hiroe | G01S 3/8083 |
| 2021/0096208 | A1* | 4/2021 | Rittenschober | G01S 5/18 |
| 2021/0233554 | A1* | 7/2021 | Buddhadev | G10L 25/24 |

OTHER PUBLICATIONS

A. H. Moore, C. Evers and P. A. Naylor, "2D direction of arrival estimation of multiple moving sources using a spherical microphone array," 2016 24th European Signal Processing Conference (EUSIPCO), Budapest, Sep. 2016, pp. 1217-1221.

Suvorov et al., "Deep residual network for sound source localization in the time domain", Journal of Engineering and Applied Sciences, 2018, vol. 13, No. 13, p. 5096-5104, Aug. 2018.

S. Adavanne, A. Politis and T. Virtanen, "Direction of Arrival Estimation for Multiple Sound Sources Using Convolutional Recurrent Neural Network," 2018 26th European Signal Processing Conference (EUSIPCO), Rome, Sep. 2018, pp. 1462-1466.

Y. Sun, J. Chen, C. Yuen and S. Rahardja, "Indoor Sound Source Localization With Probabilistic Neural Network," in IEEE Transactions on Industrial Electronics, vol. 65, No. 8, pp. 6403-6413, Aug. 2018.

Grondin et al., "Sound Event Localization and Detection Using CRNN on Pairs of Microphones", Oct. 2019, pp. 1-6.

Ding et al., "Three-dimensional localization of point acoustic sources using a planar microphone array combined with beamforming", Dec. 2018, pp. 1-17.

K. Sekiguchi, Y. Bando, K. Nakamura, K. Nakadai, K. Itoyama and K. Yoshii, "Online simultaneous localization and mapping of multiple sound sources and asynchronous microphone arrays," 2016 IEEE/RSJ International Conference on Intelligent Robots and Systems (IROS), Daejeon, Oct. 2016, pp. 1973-1979.

Vera-Diaz JM, Pizarro D, Macias-Guarasa J. "Towards End-to-End Acoustic Localization Using Deep Learning: From Audio Signals to Source Position Coordinates". Sensors. Oct. 2018; 18(10):3418.

G. L. Moing et al., "Learning Multiple Sound Source 2D Localization," 2019 IEEE 21st International Workshop on Multimedia Signal Processing (MMSP), Kuala Lumpur, Malaysia, Sep. 2019, pp. 1-6.

* cited by examiner

TWO-DIMENSIONAL SOUND LOCALIZATION WITH TRANSFORMATION LAYER

The following disclosure(s) are submitted under 35 U.S.C. § 102(b)(1)(A):

DISCLOSURE(S): Learning 2D Sound Source Localization for Microphone Array Layout Invariance using Explicit Transformation Layer, by Vinayavekhin, Le Moing, Vongkulbhisal, Agravante, Inoue, Munawar, and Tachibana, made available on Feb. 28, 2020, 3 pages.

BACKGROUND

The present invention generally relates to localizing the source of a sound in a two-dimensional field, and, more particularly to training a system for performing such localization in a manner that generalizes to any sensor positioning.

Identifying the source of a sound in a two-dimensional field, for example with multiple microphones in a enclosed room, can be challenging. Training a machine learning system with a variety of different microphone positions fails to account for situations where the microphones move, or where the microphones are placed in locations that lack adequate training data. As a result, the accuracy of such systems is diminished in many realistic scenarios.

SUMMARY

A method for localizing a sound source includes determining a spatial transformation between a position of a reference microphone array and a position of a displaced microphone array. A sound is measured at the reference microphone array and at the displaced microphone array. A source of the sound is localized using a neural network that includes respective paths for the reference microphone array and the displaced microphone array. The neural network further includes a transformation layer that represents the spatial transformation.

A system for localizing a sound source includes a microphone interface configured to determine a spatial transformation between a position of a reference microphone array and a position of a displaced microphone array, and to measure a sound at the reference microphone array and the displaced microphone array. A localization model is configured to localize a source of the sound using a neural network that includes respective paths for the reference microphone array and the displaced microphone array, and that further includes a transformation layer that represents the spatial transformation.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention use a machine learning system to localize sound sources in a two dimensional field, where a spatial relationship between multiple microphones is explicitly provided as a spatial transformation. This provides superior localization performance in situations where the microphone arrays can be placed in arbitrary positions, as compared to systems trained with only a single microphone positioning and systems trained with a variety of different microphone positions.

As a general matter, two-dimensional sound source localization identifies the two-dimensional Cartesian coordinates of one or more sound sources in an enclosed environment. Multiple microphone arrays are used to identify the direction of arrival (DOA) from various points in the environment, and this information is provided to a machine learning system to identify the locations of the sources. While this approach is robust against noise in the environment, it can be difficult to train in a general manner, for arbitrary microphone placement. Even using training data sets that include a variety of different microphone starting positions can provide only approximate results for the sound source location when the microphone arrays are moved to a new location.

Sound source localization is a technological process that can help identify, for example, the location of movement in a large space, the source of a leak in a pipeline, the source of a failure in a complicated physical system, and for many other applications. By improving the accuracy of sound localization, the present embodiments represent an improvement to all of these myriad applications. The present embodiments provide improved sound localization results, with lower error metrics in a greater variety of physical arrangements, than other approaches.

Figure 1:
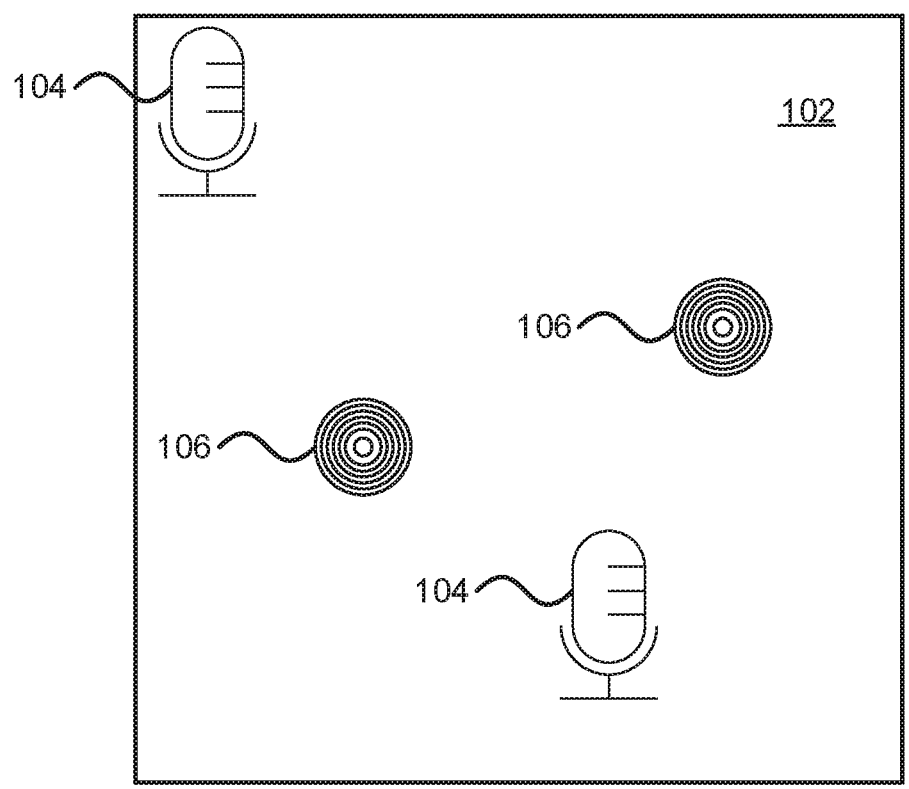
FIG. 1 is a diagram of an environment that includes one or more sound sources, as well as microphone arrays that are configured to localize the sound source(s), in accordance with an embodiment of the present invention.

Referring now to the drawings in which like numerals represent the same or similar elements and initially to FIG. 1, an exemplary environment 102 is shown. The environment 102 includes multiple microphone arrays 104, each of which is capable of identifying the DOA of incoming sound from its own perspective. The environment 102 further includes multiple sound sources 106. The microphone arrays 104 record sound from the sound sources 106 and provide DOA information to a localization system, described in greater detail below, to identify the coordinates of each sound source 106.

It should be understood that the microphone arrays 104 may be any appropriate type of direction-finding audio sensor. Exemplary sensors include arrays of multiple audio sensors, arranged in a configuration that makes it possible to determine a DOA from differences in the arrival times of the sound pressure waves. In such devices, the speed of sound in an environment is used to identify the DOA from the arrival times. In other embodiments, each microphone array 104 may include a set of directional audio sensors, each configured to detect sounds arriving from a different respective direction. While embodiments with two microphone arrays 104 are specifically contemplated, it should be understood that the present principles also apply to embodiments that include more than two microphone arrays 104. Additionally, while it is specifically contemplated that the respective microphone arrays 104 can include identical hardware, it should be understood that differing types of audio sensors can be used.

It should be understood that there may be any number of sound sources 106 within the environment 102. While sources of audible sounds are specifically contemplated, the sound sources 106 can also include sources of infrasound and ultrasound, at frequencies outside of the range of human hearing. More generally, the sound sources 106 can represent the sources of changes in air pressure, such as a new leak in a pressurized environment. In such embodiments, the microphone arrays 104 can be replaced with pressure sensors, to detect the direction of arrival of the change in ambient pressure.

Figure 2:
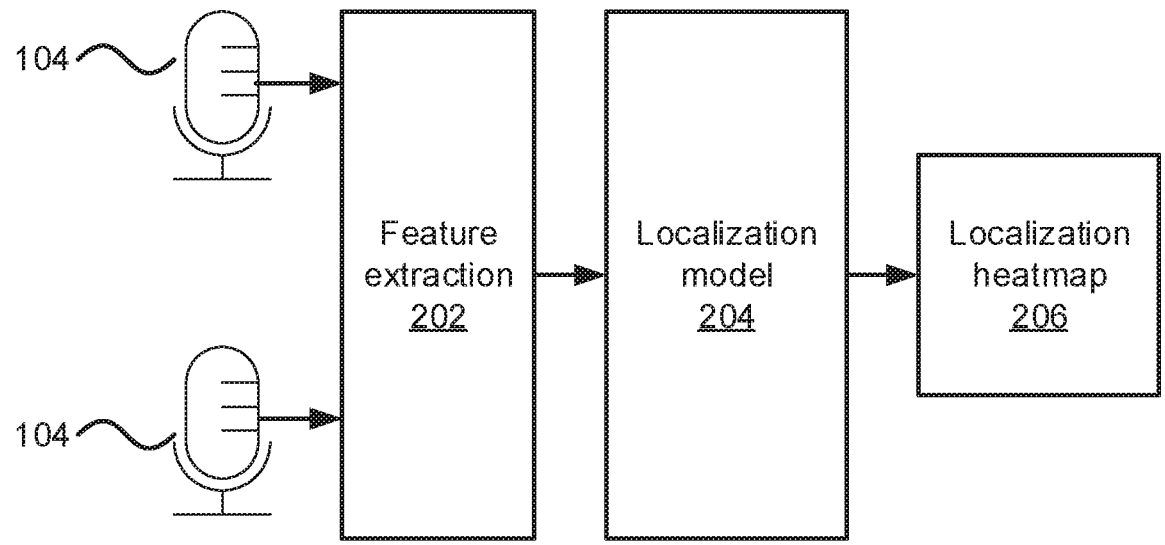
FIG. 2 is a block diagram of a sound localization system that uses spectral information from multiple microphone arrays to generate a sound source localization heatmap, in accordance with an embodiment of the present invention.

Referring now to FIG. 2, a block/flow diagram is shown of a process/system for localizing sound sources 106 in the environment 102. The microphone arrays 104 provide their audio information to feature extractor 202. The feature extractor 202 converts the audio information into spectral information. In some embodiments, a short-time Fourier transform (STFT) is used to generate the spectral information. The real and imaginary part of the spectrograms can be used, while the zero-frequency component can be discarded. This spectral information can additionally, or alternatively, include other features, such as mel-spectrogram or log mel-spectrogram, as long as it includes the phase information of the raw sound. A localization model 204 can later combine multiple spectral feature, and extract the phase difference among them as a location cue of the sound sources.

A localization model 204 takes the spectral features from the feature extractor 202 and generates a localization heatmap 206. The localization model 204 includes a machine learning model that is trained to determine the localization heatmap 206, based on the spectral features, with the addition of explicit positioning information that establishes a translational and rotational transformation from the position and orientation of a first microphone array 104 to a second microphone array 104. The structure of the localization model 204 is described in greater detail below.

The localization heatmap 206 can include, for example, a set of pixels that correspond to Cartesian coordinates within the environment 102. At each pixel in the heatmap 206, a value of the pixel can correspond to a likelihood that the sound source 106 is at that coordinate. Thus, the localization heatmap 206 can be visualized as an image, with the value of each pixel being represented as a color, ranging from blue to red. Thus, an environment 102 that includes two distinct sound sources 106 will produce a localization heatmap 206 that has two distinct regions of high-valued pixels.

Figure 3:
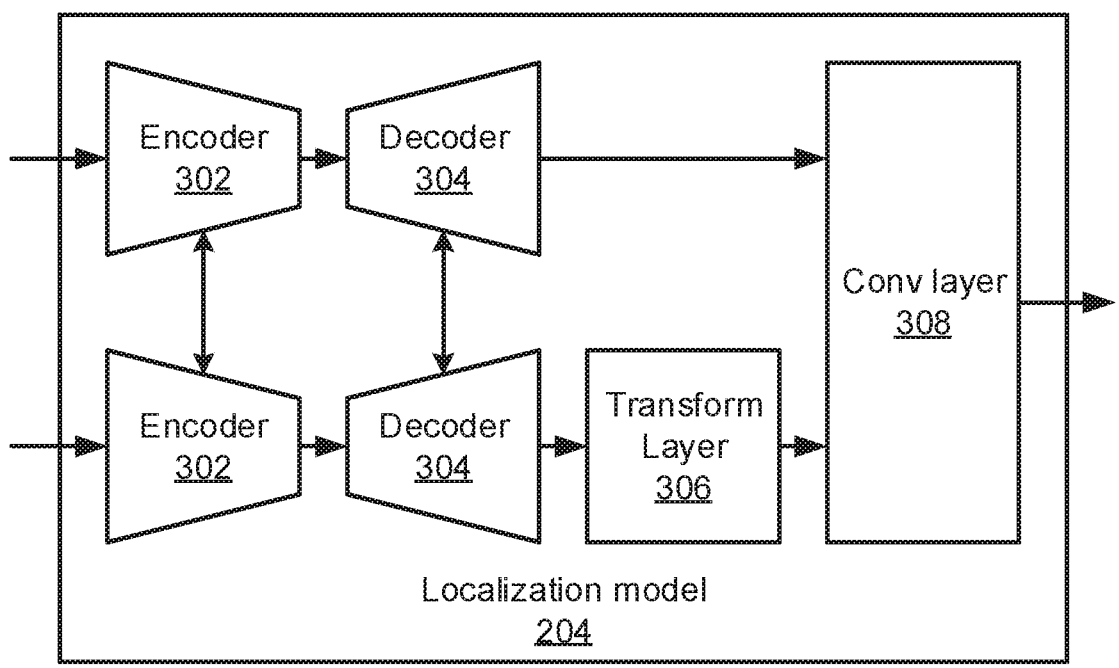
FIG. 3 is a block diagram of a localization model that includes a path for each respective microphone array, and that includes an explicit spatial transformation layer that identifies the spatial relationship between the microphone arrays, in accordance with an embodiment of the present invention.

Referring now to FIG. 3, a block diagram is shown with additional detail on the localization model 204. As noted above, the localization model 204 accepts spectral features from multiple microphone arrays 104. Each set of features is passed to a respective autoencoder path, including an encoder 302 and a decoder 304. In some embodiments, the encoders 302 in the two paths share learned parameters with one another. In some embodiments, the decoders 304 in the two paths share learned parameters with one another.

In some embodiments, encoders 302 in the autoencoder paths represent the spectral feature information as a lower-dimensional embedding, for example as a vector in a space having a lower dimensionality than the spectral information. This encoded information is then decoded by the respective decoder 304 to reconstruct the input. The reconstructed input can be compared to the input to verify the accuracy of the embedding. The encoders 302 and the decoders 304 can be implemented as neural networks that are trained according to a set of training data, for example using a backpropagation process. In some embodiments, the output of the decoders 304 may be a tensor T of size (w, h, n, where w and h represent the size of the heat map and f represents a feature map.

A convolutional layer 308 accepts the output of the decoders 304, and converts that information into the localization heatmap 206. Before this convolution is performed, however, one of the branches has a transformation 306 applied to it. This transformation 306 includes explicit positioning information for the spatial relationship between the microphone arrays 104, for example including translational and rotational information.

The weights of the transformation layer 306, which are described in greater detail below, are explicitly set, and are not altered through training of the neural network. The transformation layer 306 explicitly represents a two-dimensional transformation between the microphone arrays 104, which helps to combine the output of each decoder 304 into the output of the final localization heatmap 206. The use of explicit transformation information helps avoid the need to train the neural network from a variety of relative positions, and improves performance in a variety of circumstances. During training of the neural network, backpropagation can pass through the transformation layer 306 without altering its values.

In some embodiments, the transform layer 306 identifies a transformation between a reference microphone array and a displaced array. In such embodiments, only the path through the localization model 204 that is associated with the displaced array may have a transform layer 306, while the path associated with the reference array may provide the output of its decoder 304 directly to the convolutional layer 308. In other embodiments, both paths may have a transform layer 306, with the transform layer 306 that is associated with the reference array being expressed as an identity matrix.

It should be understood that additional microphone arrays 104 may be used, and that such microphone arrays 104 would then correspond to additional respective paths through the localization model 204. In such embodiments, each additional path will include a respective encoder 302 and decoder 304, as well as a respective transform layer 306.

The additional transform layers 306 identify a respective transformation from a reference microphone array 104. The reference microphone array 104 will be associated with the only path through the localization model 204 that does not include a transformation.

The relative position of two microphone arrays 104 may be expressed as the tuple ($t_x$, $t_y$, $\theta$), representing a translation along an x-axis, a translation along a y-axis, and an angular displacement, respectively. The translation/rotation can thus be expressed as a homogeneous transformation:

$$\begin{bmatrix} x_1 \\ y_1 \\ 1 \end{bmatrix} = \begin{bmatrix} \cos\theta & -\sin\theta & t_x \\ \sin\theta & \cos\theta & t_y \\ 0 & 0 & 1 \end{bmatrix} \begin{bmatrix} x_2 \\ y_2 \\ 1 \end{bmatrix}$$

Thus, the location and orientation of the displaced microphone array, relative to that of the reference microphone, is characterized by the transformation matrix, and is applied to every pixel of the tensor output of the respective decoder 304 during feed-forward processing. Because the transformation function is differentiable, backpropagation of error information through the transform layer 306 is also possible.

The output of the first decoder 304, pertaining to the reference microphone array, can be expressed as the tensor $Z_{1,1}$, and the output of the second decoder 304, pertaining to the displaced microphone array, can be expressed as the tensor $Z_{2,2}$, each having dimensions (w, h, f). The tensor $Z_{1,1}$ is expressed in a coordinate system relative to the reference microphone array, while $Z_{2,2}$ is expressed in a coordinate system relative to the displaced microphone array. The first numeral represents an identifier of the microphone array that records the sound information, while the second numeral represents an identifier of coordinate system of a microphone array that the sound information is represented in. The present embodiments transform $Z_{2,2}$ into the coordinates of the reference microphone array, expressed herein as $Z_{2,1}$.

Each audio position channel can be considered separately, without loss of generality. Thus, the channel $C_{2,2}{}^0 = (w, h, 1)$ can be transformed using the transform matrix T as shown above, where $x_1$ and $y_1$ are positions in $C_{2,1}{}^0$ and $x_2$ and $y_2$ are positions in $C_{2,2}{}^0$. Using this correspondence, the values of $C_{2,2}{}^0$ are computed. For each position in $C_{2,1}{}^0$, the corresponding point in the space ($x'_2$, $y'_2$) is determined, based on the transformation. The values of the n closest discrete positions in $C_{2,2}{}^0$ are used to determine values of $C_{2,1}{}^0$ with, for example, a bilinear interpolation. For edge cases, where there is no corresponding point, a zero value can be used instead. This transformation performed for all positions in $C_{2,1}{}^0$. When applied to all channels of $Z_{2,2}$, the output of the transformation layer 306 is $Z_{2,1}$.

Figure 4:
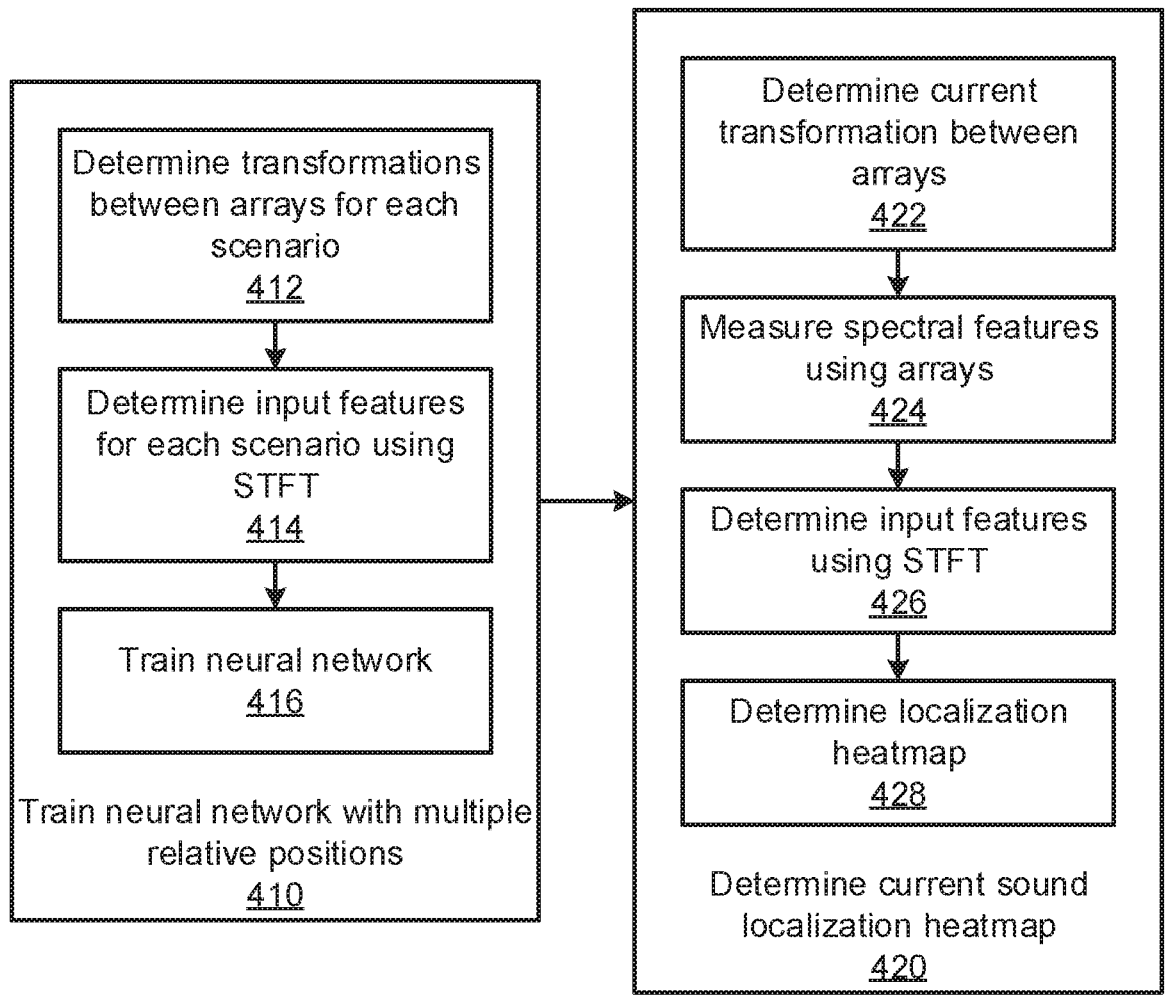
FIG. 4 is a block/flow diagram of a method for localizing a sound source using spectral information from multiple microphone arrays and spatial transformation information that identifies the spatial relationship between the microphone arrays, in accordance with an embodiment of the present invention.

Referring now to FIG. 4, a method of training and using the localization model 204 is shown. Block 410 trains the localization model 204 using a set of training data that includes multiple different training scenarios, each scenario including microphone array positions, measured sound information from the microphone arrays, and the locations of one or more sound sources 106. For each training scenario, block 412 determines a transformation between the microphone arrays, and block 414 determines input features, based on the measured sound information, using a short-time Fourier transform (STFT). In some embodiments, each training scenario may have the same transformation between the microphone arrays.

Block 416 then trains the encoders 302, the decoders 304, and the convolutional layer 306. Training can include, for example, determining heatmaps for a set of scenarios and comparing the resulting heatmaps to known sound source positions. Differences between the determined heatmaps and the known sound source positions can be treated as errors, used to refine the weights of the neural network during backpropagation. The transform layer 306 is used to encode the positional information of the microphone arrays 104.

During training, a match can be found between the predicted sound source locations and the known true sound source locations. Positions that are within a predetermined threshold (e.g., less than about 0.3 m) can be considered a match. Evaluation metrics can be used to determine the error between non-matching positions, for example using an F1 score (where a higher score indicates a better match), the root mean square error (where a lower score indicates a better match), or any other appropriate metric.

Block 420 then determines sound localization heatmaps 206 for an unknown scenario. A transformation between current microphone array positions and orientations is determined in block 422, and block 424 determines spectral features based on the sounds received at microphone arrays 104. Block 426 then determines input features to the neural network using STFT. Block 428 determines the localization heatmap 206 of the measured sound positions using the measured sound information and the transformation information in a feed-forward operation. It should be noted that the transformation can be determined at any time before the localization heatmap is determined in block 428, and need not necessarily be performed before the spectral features are measured in block 424.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 5:
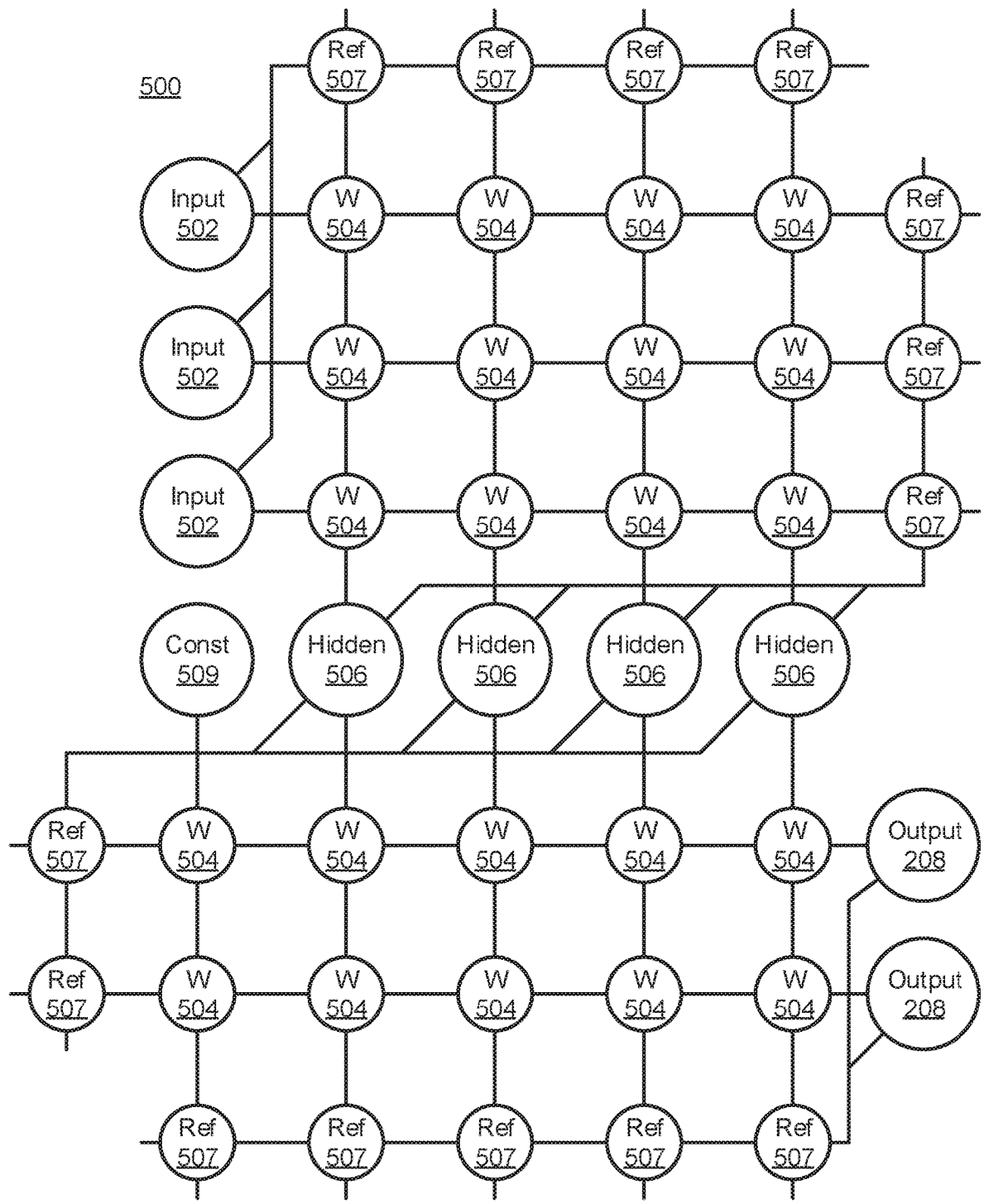
FIG. 5 is a diagram of an exemplary neural network architecture that may be used to implement a sound source localization model, in accordance with an embodiment of the present invention.

Referring now to FIG. 5, an artificial neural network (ANN) architecture 500 is shown. It should be understood that the present architecture is purely exemplary and that other architectures or types of neural network can be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 502 each provide an input voltage in parallel to a respective row of weights 504. In the hardware embodiment described herein, the weights 504 each have a settable resistance value, such that a current output flows from the weight 504 to a respective hidden neuron 506 to represent the weighted input. In software embodiments, the weights 504 can simply be represented as coefficient values that are multiplied against the relevant neuron outputs.

Following the hardware embodiment, the current output by a given weight 504 is determined as $I=V/r$, where V is the input voltage from the input neuron 502 and r is the set resistance of the weight 504. The current from each weight adds column-wise and flows to a hidden neuron 506. A set of reference weights 507 have a fixed resistance and combine their outputs into a reference current that is provided to each of the hidden neurons 506. Because conductance values can only be positive numbers, some reference conductance is needed to encode both positive and negative values in the matrix. The currents produced by the weights 504 are continuously valued and positive, and therefore the reference weights 507 are used to provide a reference current, above which currents are considered to have positive values and below which currents are considered to have negative values. The use of reference weights 507 is not needed in software embodiments, where the values of outputs and weights can be precisely and directly obtained. As an alternative to using the reference weights 507, another embodiment can use separate arrays of weights 504 to capture negative values.

The hidden neurons 506 use the currents from the array of weights 504 and the reference weights 507 to perform some calculation. The hidden neurons 506 then output a voltage of their own to another array of weights 504. This array performs in the same way, with a column of weights 504 receiving a voltage from their respective hidden neuron 506 to produce a weighted current output that adds row-wise and is provided to the output neuron 508.

It should be understood that any number of these stages can be implemented, by interposing additional layers of arrays and hidden neurons 506. It should also be noted that some neurons can be constant neurons 509, which provide a constant output to the array. The constant neurons 509 can be present among the input neurons 502 and/or hidden neurons 506 and are only used during feed-forward operation.

During back propagation, the output neurons 508 provide a voltage back across the array of weights 504. The output layer compares the generated network response to training data and computes an error. The error is applied to the array as a voltage pulse, where the height and/or duration of the pulse is modulated proportional to the error value. In this example, a row of weights 504 receives a voltage from a respective output neuron 508 in parallel and converts that voltage into a current which adds column-wise to provide an input to hidden neurons 506. The hidden neurons 506 combine the weighted feedback signal with a derivative of its feed-forward calculation and stores an error value before outputting a feedback signal voltage to its respective column of weights 504. This back propagation travels through the entire network 500 until all hidden neurons 506 and the input neurons 502 have stored an error value.

During weight updates, the input neurons 502 and hidden neurons 506 apply a first weight update voltage forward and the output neurons 508 and hidden neurons 506 apply a second weight update voltage backward through the network 500. The combinations of these voltages create a state change within each weight 504, causing the weight 504 to take on a new resistance value. In this manner the weights 504 can be trained to adapt the neural network 500 to errors in its processing. It should be noted that the three modes of operation, feed forward, back propagation, and weight update, do not overlap with one another.

As noted above, the weights 504 can be implemented in software or in hardware, for example using relatively complicated weighting circuitry or using resistive cross point devices. Such resistive devices can have switching characteristics that have a non-linearity that can be used for processing data. The weights 504 can belong to a class of device called a resistive processing unit (RPU), because their non-linear characteristics are used to perform calculations in the neural network 500. The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

Figure 6:
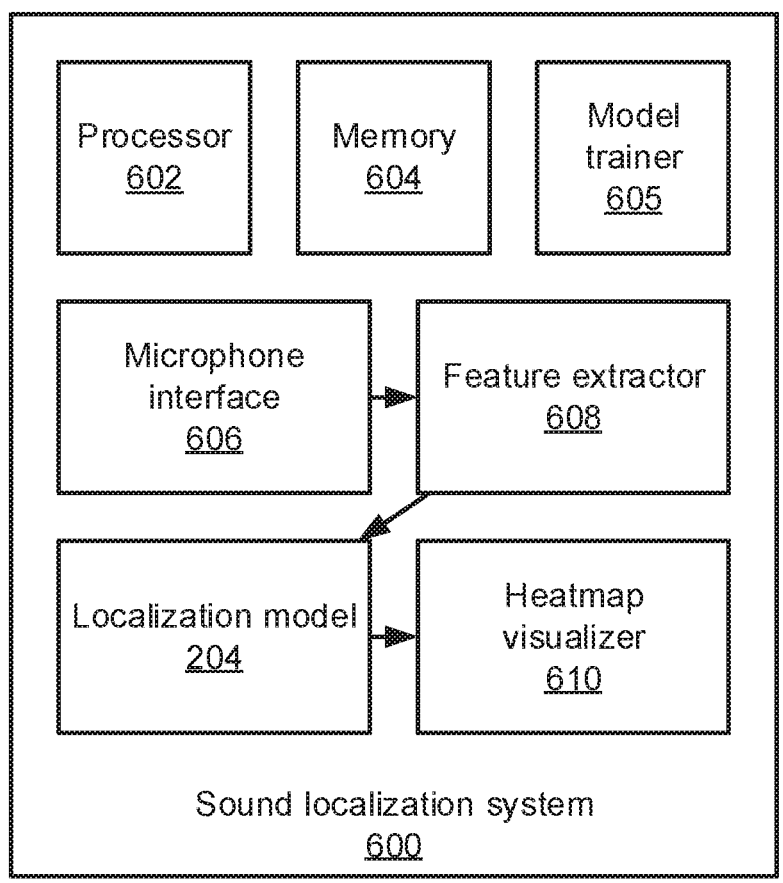
FIG. 6 is a block diagram of a sound localization system that uses spectral information from multiple microphone arrays to generate a sound source localization heatmap, in accordance with an embodiment of the present invention.

Referring now to FIG. 6, a sound localization system 600 is shown. The system 600 includes a hardware processor 602 and a memory 604. A microphone interface 606 is included, to provide a connection to the microphone arrays 104. The microphone interface 606 can receive information from the microphone arrays 104 via any appropriate wired or wireless connection, by any appropriate digital or analog communication protocol or format. The microphone interface 606 can furthermore automatically detect spatial transformation information that characterizes the spatial relationships between the microphone arrays 104.

A feature extractor 608 converts the raw audio information, provided by the microphone arrays 104, into audio feature information. The localization model 204 uses the transformation information and the input audio information to determine a localization heatmap 206 that identifies the location(s) of the sound source(s) 106 within an environment 102. A model trainer 605 uses a set of training data, stored within the memory 604, to train the localization model, for example using one or more different transformations between the microphone arrays.

A heatmap visualizer 610 then provides a user interface, with which a user can find the locations within the environment 102. In some embodiments, the heatmap visualizer 610 may provide a graphical view that pinpoints sound sources within a representation of the environment 102. In other embodiments, the heatmap visualizer 610 may provide a set of coordinates, for example in a reference frame of one of the microphone arrays.

Figure 7:
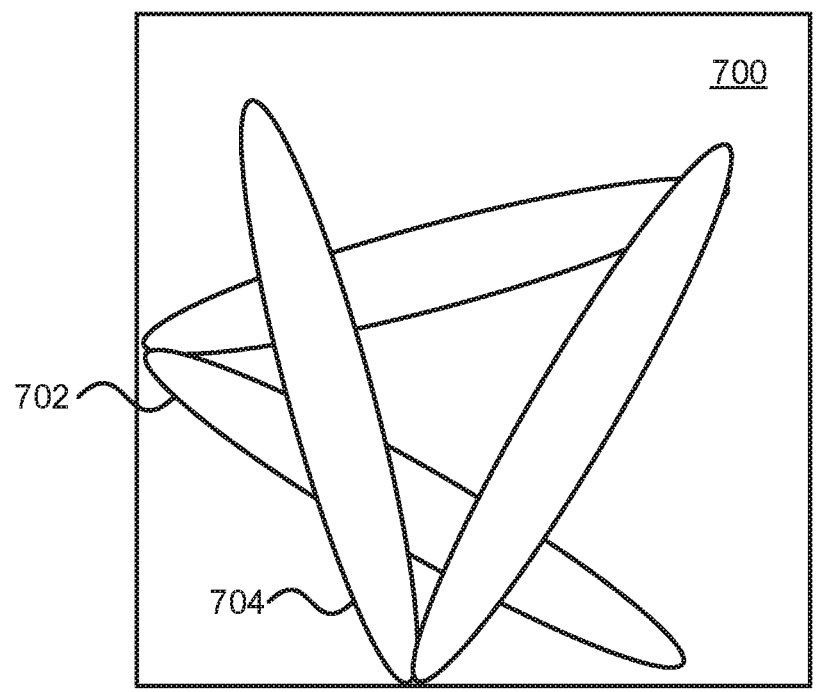
FIG. 7 is a diagram of measured sound information in an environment, in accordance with an embodiment of the present invention.

Referring now to FIG. 7, a diagram of measured sound information in an environment 700 is shown. The DOAs measured by a first microphone array 702 is shown as a pair of ellipses, indicating that there are at least two sound sources in the environment 700. The DOAs measured by a second microphone array 704 is also shown as a pair of ellipses, overlapping those measured by the first microphone array 702. This information is fed to the feature extraction 202 and the localization model 204.

Figure 8:
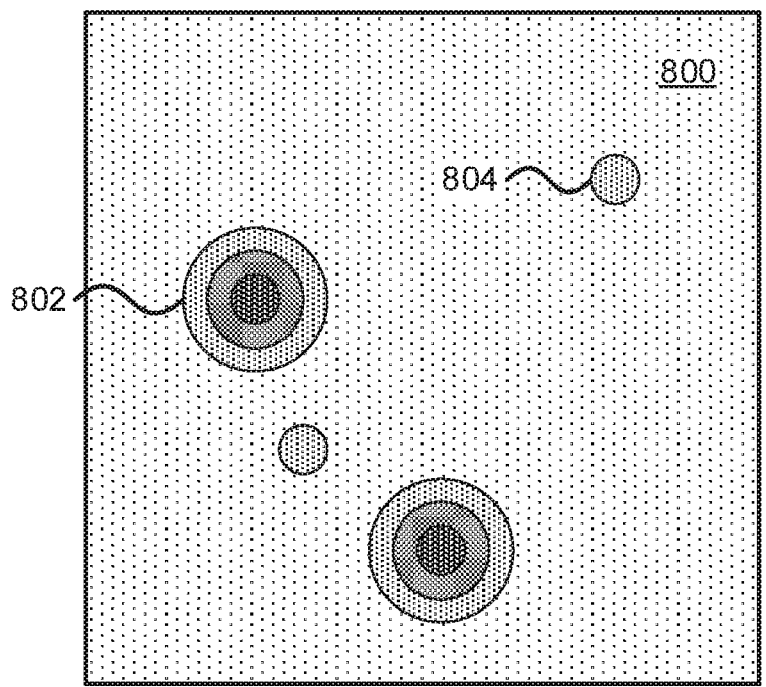
FIG. 8 is diagram of a localization heatmap that identifies sound sources in an environment, in accordance with an embodiment of the present invention.

Referring now to FIG. 8, an exemplary localization heatmap 800 is shown, corresponding to the measured sound information of FIG. 7. The heatmap 800 shows regions 802 that indicate a heightened probability of a sound source being present. It also shown are regions 804 of relatively low probability, which indicate regions that are shown to have a low, but non-zero, probability of being a sound source. The present embodiments learn to address ambiguous information in the input sound information to distinguish between these regions.

Having described preferred embodiments of two-dimensional sound localization with transformation layer (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for localizing a sound source, comprising:
determining a spatial transformation between a position of a reference microphone array and a position of a displaced microphone array;
measuring a sound at the reference microphone array and the displaced microphone array; and
localizing a source of the sound using a neural network that includes different respective paths for the reference microphone array and the displaced microphone array, and further includes a transformation layer that represents the spatial transformation.

2. The method for localizing a sound source of claim 1, wherein only the path for the displaced microphone array includes the transformation layer.

3. The method for localizing a sound source of claim 1, wherein each path in the neural network includes a respective autoencoder and each path provides an output to a shared convolutional layer.

4. The method for localizing a sound source of claim 3, wherein the transformation layer is between the autoencoder on one path and the convolutional layer.

5. The method for localizing a sound source of claim 1, wherein the transformation layer implements a transformation matrix, with fixed, predetermined weights that are not affected by training.

6. The method for localizing a sound source of claim 1, further comprising training the neural network using a training data set that includes scenarios based on a plurality of different spatial transformations.

7. The method for localizing a sound source of claim 1, further comprising training the neural network using a training data set that includes scenarios characterized by only a single spatial transformation.

8. The method for localizing a sound source of claim 1, wherein localizing the sound source includes generating a localization heatmap.

9. The method for localizing a sound source of claim 1, further comprising:
determining a spatial transformation between a position of a reference microphone array and one or more additional displaced microphone arrays; and
measuring the sound at the one or more additional displaced microphone arrays.

10. The method for localizing a sound source of claim 9, wherein localizing a source of the sound further includes a transformation layer for each of the one or more additional displaced microphone arrays.

11. A non-transitory computer readable storage medium comprising a computer readable program for localizing a sound source, wherein the computer readable program when executed on a computer causes the computer to perform the steps of:
determining a spatial transformation between a position of a reference microphone array and a position of a displaced microphone array;
measuring a sound at the reference microphone array and the displaced microphone array; and
localizing a source of the sound using a neural network that includes different respective paths for the reference microphone array and the displaced microphone array, and further includes a transformation layer that represents the spatial transformation.

12. A system for localizing a sound source, comprising:
a microphone interface configured to determine a spatial transformation between a position of a reference microphone array and a position of a displaced microphone array and to measure a sound at the reference microphone array and the displaced microphone array; and
a localization model configured to localize a source of the sound using a neural network that includes different respective paths for the reference microphone array and the displaced microphone array, and further includes a transformation layer that represents the spatial transformation.

13. The system for localizing a sound source of claim 12, wherein each path in the neural network includes a respective autoencoder and each path provides an output to a shared convolutional layer.

14. The system for localizing a sound source of claim 13, wherein the transformation layer is between the autoencoder on one path and the convolutional layer.

15. The system for localizing a sound source of claim 12, wherein the transformation layer implements a transformation matrix, with fixed, predetermined weights that are not affected by training.

16. The system for localizing a sound source of claim 12, further comprising a model trainer configured to train the neural network using a training data set that includes scenarios based on a plurality of different spatial transformations.

17. The system for localizing a sound source of claim 12, further comprising a model trainer configured to train the neural network using a training data set that includes scenarios characterized by only a single spatial transformation.

18. The system for localizing a sound source of claim 12, wherein the localization model is further configured to generate a localization heatmap for the source of the sound.

19. The system for localizing a sound source of claim 12, wherein the microphone interface is further configured to determine a spatial transformation between a position of a reference microphone array and one or more additional displaced microphone arrays, and to measure the sound at the one or more additional displaced microphone arrays.

20. The system for localizing a sound source of claim 19, wherein the localization model further includes a transformation layer for each of the one or more additional displaced microphone arrays.

* * * * *